(12) United States Patent
Guertner

(10) Patent No.: US 9,135,196 B2
(45) Date of Patent: Sep. 15, 2015

(54) METHOD FOR OPERATING A BUS SYSTEM FOR COMMUNICATION WITH A PLURALITY OF COMMUNICATION NODES, AND MOTOR VEHICLE

(75) Inventor: Fred Guertner, Manching (DE)

(73) Assignee: AUDI AG, Ingolstadt (DE)

( * ) Notice: Subject to any disclaimer, the term of this patent is extended or adjusted under 35 U.S.C. 154(b) by 44 days.

(21) Appl. No.: 14/125,446

(22) PCT Filed: May 31, 2012

(86) PCT No.: PCT/EP2012/002296
§ 371 (c)(1),
(2), (4) Date: Jul. 15, 2014

(87) PCT Pub. No.: WO2012/167880
PCT Pub. Date: Dec. 13, 2012

(65) Prior Publication Data
US 2014/0325106 A1  Oct. 30, 2014

(30) Foreign Application Priority Data

Jun. 10, 2011   (DE) .......................... 10 2011 103 938

(51) Int. Cl.
*G06F 13/372*   (2006.01)
*H04L 12/403*   (2006.01)
*H04L 12/417*   (2006.01)
*H04L 12/40*    (2006.01)

(52) U.S. Cl.
CPC .......... *G06F 13/372* (2013.01); *H04L 12/4035* (2013.01); *H04L 12/417* (2013.01); *H04L 2012/40241* (2013.01); *H04L 2012/40273* (2013.01)

(58) Field of Classification Search
USPC ................... 710/300–306, 105, 124; 370/412
See application file for complete search history.

(56) References Cited

U.S. PATENT DOCUMENTS

| 7,430,261 | B2  |  9/2008 | Forest et al. |
| 8,306,004 | B2* | 11/2012 | Kobayashi ..................... 370/338 |
| 8,693,488 | B2* |  4/2014 | Fuhrmann ...................... 370/412 |
| 8,972,639 | B2* |  3/2015 | Horihata ....................... 710/105 |
| 2009/0282164 | A1* | 11/2009 | Fuehrer et al. ................ 709/236 |

FOREIGN PATENT DOCUMENTS

| DE | 2262933  | 6/1974 |
| DE | 60301637 | 6/2006 |

(Continued)

OTHER PUBLICATIONS

English Language Copy of International Search Report for PCT/EP2012/002296, mailed Sep. 26, 2012, 2 pages.

(Continued)

*Primary Examiner* — Tim T Vo
*Assistant Examiner* — Kim T. Huynh
(74) *Attorney, Agent, or Firm* — Staas & Halsey LLP

(57) ABSTRACT

A method operates a bus system for communication with a plurality of communication nodes, in particular in a land vehicle and/or aircraft. A static, cyclically recurring time window of fixed length each communication node is assigned a time slot for transmission of user information of a byte count that can be specified at least once and fixed during the operation of the bus system. The time window has at least two cohesive sub-time windows. The same byte count is specified for all time slots of a sub-time window.

12 Claims, 1 Drawing Sheet

(56) References Cited

FOREIGN PATENT DOCUMENTS

| | | |
|---|---|---|
| DE | 60301767 | 6/2006 |
| DE | 60302697 | 8/2006 |
| DE | 60301752 | 11/2006 |
| DE | 102005033830 | 1/2007 |
| DE | 102006003067 | 7/2007 |
| DE | 60314935 | 12/2007 |
| DE | 10201110393.8 | 6/2011 |
| WO | PCT/EP2012/002296 | 5/2012 |

OTHER PUBLICATIONS

German Office Action for German Priority Patent Application No. 10 2011 103 938.8, issued Nov. 28, 2011, 10 pages.

WIPO English Language Translation of International Preliminary Report on Patentability for PCT/EP2012/002296, downloaded from WIPO website Dec. 11, 2013, 5 pages.

* cited by examiner

METHOD FOR OPERATING A BUS SYSTEM FOR COMMUNICATION WITH A PLURALITY OF COMMUNICATION NODES, AND MOTOR VEHICLE

CROSS REFERENCE TO RELATED APPLICATIONS

This application is based on and hereby claims priority to International Application No. PCT/EP2012/002296 filed on May 31, 2012 and German Application No. 10 2011 103 938.8 filed on Jun. 10, 2011, the contents of which are hereby incorporated by reference.

BACKGROUND

The invention relates to a method for operating a bus system for communication with a plurality of communication subscribers, in particular in a land vehicle and/or aircraft.

Bus systems which permit and organize communication between different communication subscribers are known and are frequently also used in land vehicles and/or aircraft, for example motor vehicles. So that decentralized communication is at all possible via a bus system, various standards are known according to which a bus system, for example CAN buses or FlexRay buses, can be operated.

The FlexRay bus was developed selectively for automobiles and is a serial, deterministic and fault-tolerant field bus system. In order to establish a node of the FlexRay bus system, for example in order to connect a control device in a motor vehicle to the FlexRay bus, a "bus transceiver" and a "communication controller" are required as components, wherein the "bus transceiver" constitutes the interface for the data line, and the "communication controller", for example a microprocessor, implements the bus protocol for the specific node. The bus protocol controls how a network starts, how the global time is established and maintained in the sense of synchronization, and which node, in particular which control devices, are allowed to transmit at which time. The "communication controller" therefore considers the received signals of other communication subscribers and derives the time at which its own node may transmit and prepares corresponding data packets to be transmitted.

In this context, the FlexRay protocol is defined by the fact that for each cycle a static and a dynamic time window are provided. In the static segment, each node, in particular each control device, is assigned a time slot (slot) in which it can transmit messages. In this context, each node is assigned a time slot of fixed length, ultimately therefore of fixed byte count for the user data which can be transmitted, wherein the corresponding byte count is defined before the start of the operation of the bus system. The node must not exceed the byte count and therefore the chronological length of the time slot thereof. If the message to be transmitted is too long, the next cycle or the dynamic time window must be used to continue the message. The purpose of the static time window is to represent a deterministic part of the bus protocol so that important messages, for example relating to a steering system or a braking system, can be transmitted within a known time.

The dynamic time window, which is fixed in its overall length, can be used by a node, in particular by a control device, if relatively long messages or further messages are to be transmitted and the byte count of the static slot thereof is not sufficient, or said byte count is used for messages with a higher priority. The time slots (minislot) in the dynamic time window may elapse once here if a control device did not wish to output a message. As soon as a node wishes to transmit a message, the time at which the next node can transmit is shifted, rearward in accordance with the length of the message, with the result that it may be the case that further nodes can no longer transmit and the entire dynamic time window is used up. The minislots of the dynamic time window are consequently allocated according to certain priorities.

In one cycle, in this context it is also possible to provide a further time window, the "Network Idle Time" (NIT), which is intended to permit the node to perform precise synchronization again.

The messages or data packets which are sent over a bus system, for example a FlexRay bus system, are usually constructed in such a way that they comprise a header, the actual user data ("payload") and a trailer. In addition, the time period, which cannot be used for user data, of each time slot can comprise a "Channel Idle Time" (CIT) and a "Channel Idle Delimiter" (CID).

In bus systems with a static time window (often also a static schedule region), for example a FlexRay bus, the byte count of a slot (time slot) of the static time window can consequently be defined for all the time slots contained therein, and said byte count therefore also determines the length of the static time window. In this context, for example byte counts from 0 to 254 bytes can be selected. This is, however, disadvantageous in that ultimately bandwidth is wasted. This is because if a high byte count is selected (broad slot configuration), subscribers with a small communication requirement cannot use the high bandwidth assigned to them in the time slot thereof. If, on the other hand, small byte counts are selected (narrow slot configuration), communication subscribers with a high communication requirement must use a plurality of time slots and therefore have high losses owing to the multiple use of the time periods which are not suitable for user data in each time slot, in particular owing to the multiple use of the header, of the trailer, of the CIT and of the CID.

SUMMARY

One potential object is therefore specifying a method in which effective use of a static time window (schedule region) in a bus system, in particular a FlexRay bus system, is possible.

The inventor proposes a method for a static, cyclically recurring time window of fixed length. Each communication subscriber is assigned a time slot for transmitting user information of a byte count which can be specified at least once and is fixed during the operation of the bus system. The time window has at least two coherent sub-time windows, wherein the same byte count is defined for all the time slots of a sub-time window.

The inventor therefore proposes that not only a single, fixed byte count be provided before the operation of the bus system for the static time window but rather that there are at least two sub-time windows in which time slots of specific communication subscribers are combined. A byte count for the user data can then be defined independently for each of these sub-windows, that is to say the byte counts which are assigned to the sub-time windows can be different. The number of time slots in a sub-time window and the byte count used specifically therein can be selected as a function of the architecture, that is to say it is possible to perform adjustment to the specific requirements of the specifically implemented bus system, for example in a land vehicle and/or aircraft. In particular, an extension of the known FlexRay standard would be conceivable here, with the result that the various definable slot widths (byte counts) which are conceived can also be implemented there. The proposed method is therefore preferably used to extend the bus protocol of a FlexRay bus system.

In this context, in one expedient refinement two or three sub-time windows can be used. The use of a larger number of sub-time windows than three can lead to problems in that the computational complexity rises considerably for each communication subscriber the more different byte counts are necessary. These byte counts would in fact have to be present in every communication subscriber, in particular every control device for the latter to be able to track when its own time slot is reached. It has now become apparent that the use of two or three sub-time windows can be implemented favorably and at low expenditure with respect to the computational complexity, without the bus protocol becoming too highly complex in this respect.

In one specific refinement, in this context it is possible to provide that a sub-time window is defined for communication subscribers with a large communication requirement, in particular with a byte count higher than 60 bytes, a sub-time window is defined for communication subscribers with a medium communication requirement, in particular with a byte count between 20 and 70 bytes, and a sub-time window is defined for communication subscribers with a low communication requirement, in particular, with a byte count of less than 24 bytes. For example, it is therefore conceivable to apportion the communication subscribers according to their communication requirement into various groups which are then assigned to the various sub-time windows. It is, of course, also conceivable to provide two different static sub-time windows, specifically a sub-time window for communication subscribers with a large communication requirement, in particular with a byte count higher than 60 bytes, and a sub-time window for communication subscribers with a low communication requirement, in particular with a byte count of less than 60 bytes. In the example of a motor vehicle, subscribers with a large communication requirement are, for example, the control devices of the engine, of the transmission, of the ESP system and of the brake system, and subscribers with a medium communication requirement are, for example, airbag control devices or control devices of a communication display, and subscribers with a low communication requirement are, for example, control devices of a steering angle sensor, of a trailer hitch and door control devices.

Since it is possible, for example according to the FlexRay standard, to fix byte counts to values between 0 and 254 bytes, this can also be provided in the proposed method.

In this context, it will again be emphasized at this point that according to the definition of the byte counts for the slot width (time slot width) of a sub-time window the latter are defined during the operation of the bus system, and consequently define static time periods of the cycle. The byte numbers of the static time window are consequently invariable during the operation of the bus system. This contrasts with a dynamic time window which can also be part of a cycle.

It is therefore possible to provide that the static time window is part of a communication cycle which is composed of the static time window and a dynamic time window in which the size of the individual time slots is adapted at least partially dynamically during the operation of the bus system. Such a dynamic time window can be used to transmit further user data, relatively large user data, or additional user data.

As already clearly stated, each time slot is usually composed not only of a time period which can be used for user data but also comprises a time period which cannot be used for user data, wherein such a time period which cannot be used for user data in the time slot can also be provided in the method, which time period is used, in particular, by a header and/or a trailer and/or a channel idle time (CIT) and a channel idle delimiter (CID). This additional time period is usually defined by the bus protocol which is used.

In addition to the method, the inventor proposes a motor vehicle, comprising a bus system with a plurality of communication subscribers, in particular control devices, which bus system is designed to carry out the method. All the statements relating to the method can analogously be transferred to the motor vehicle, which method consequently permits the above-mentioned advantages to be achieved. The bus system which is operated according to the method can also be used in an excellent manner in other land vehicles and aircraft, wherein, in particular, a bus system according to the FlexRay standard can be used.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
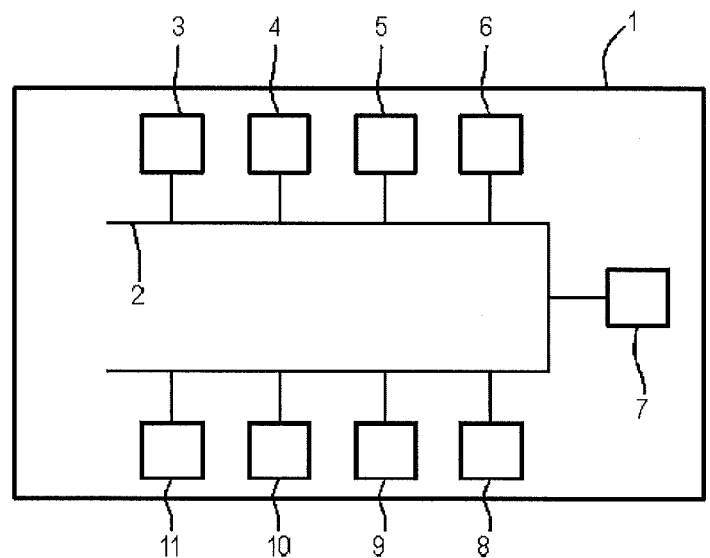
FIG. 1 shows a basic sketch for a proposed motor vehicle according to one potential embodiment.

Reference will now be made in detail to the preferred embodiments of the present invention, examples of which are illustrated in the accompanying drawings, wherein like reference numerals refer to like elements throughout.

FIG. 1 shows a basic sketch of a motor vehicle 1. Said motor vehicle 1 comprises a bus system with a data line 2 to which a plurality of communication subscribers in the form of control devices are connected, of which the following are shown here merely by way of example: an engine control device 3, a transmission control device 4, an ESP control device 5, a brake control device 6, an airbag control device 7, a combination display control device 8, a steering angle control device 9, a trailer hitch control device 10 and a door control device 11. Of course, further control devices are also provided which are not illustrated here in more detail.

According to the method, the bus system can now be configured here in such a way that the communication cycle, which comprises here a static time window and a dynamic time window, permits two or three sub-time windows to be defined with respect to the static time window, the time slots of which sub-time windows, which are assigned to individual communication subscribers, have a defined length of the user data (payload), that is to say a sub-time-window-specific byte count between 0 and 254 bytes which can be defined before operation of the bus system.

This will be explained in more detail using FIG. 2 in an example which relates here only to eleven communication subscribers, for the sake of better illustration; further more specific examples are also presented below. As already mentioned, a communication cycle 12 comprises here a static time window 13 with time slots (slots) of a slot width, that is to say byte count, which is invariable during the operation of the bus system. In addition, a dynamic time window 23 is provided within which the size of a time slot can be dynamically adapted. Such dynamic time windows are basically known and will not be presented here in more detail.

Figure 2:
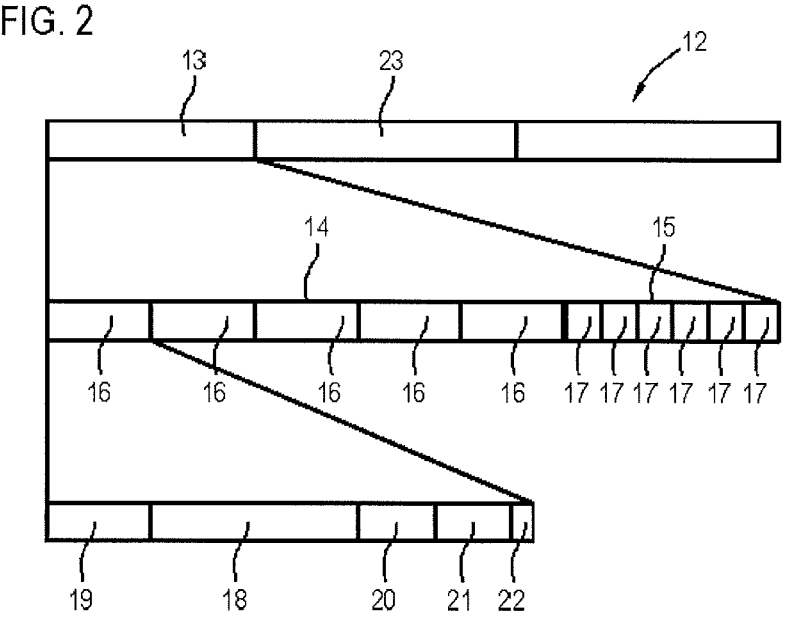
FIG. 2 shows a communication cycle in the proposed method.

From FIG. 2 it is also clear in more detail that the static time window 13 is divided into two sub-time windows 14, 15 which are embodied in a coherent fashion. In the illustrated exemplary embodiment, the first sub-time window 14 has in this context five time slots 16 with a high byte count, for example 100 bytes. This high byte count of the first time slot 16 was defined before operation of the bus system, that is to say like the number of the communication subscribers and the communication subscribers to which the time slots 16 are assigned.

Correspondingly, the second sub-time window 15 comprises six successive time slots 17 with a lower byte count, for example 40 bytes, which was defined before operation of the bus system, said bytes being in turn assigned to fixed communication subscribers with a relatively small communication requirement. Since there is only a small number of sub-time windows, an individual control device as a communication subscriber can also determine with a little expenditure when its own time slot 16 or 17 begins, while, however, greater flexibility and adaptability to the specific architecture of the bus system are provided since subscribers with a large communication requirement can receive a time slot in the first sub-time window 14, and subscribers with a small communication requirement can receive a time slot 17 in the second sub-time window 15.

FIG. 2 additionally also schematically shows the design of a time slot 16 (or 17 analogously) per se. In addition to a time slot 18 which is provided for the user data itself, a header 19 is clearly firstly also provided which contains, inter alia, information such as the length of the user data actually contained, various indicators and the like. The user data is followed by a trailer 20 which can contain, for example, checksums. The trailer 20 is followed by a channel idle time (CIT) 21. The latter is terminated by the channel idle delimiter 22.

The proposed method clearly permits two or three sub-time windows 14, 15 with different but static byte counts, that is to say ones which are defined during the operation of the bus system, to be defined as a permissible user data quantity, wherein the sub-time windows 14, 15 form a static part of the communication cycle 12 during the operation, and are repeated cyclically as known.

At the end, two specific implementation possibilities in a communication cycle of 5 milliseconds are also specified, wherein the static time window is 3 milliseconds long, and the dynamic time window is 2 milliseconds. In the case of division into three different static sub-time windows it is possible to use the following sub-time windows:

a) A first sub-time window for communication subscribers with a high level of communication complexity whose length is 960 μs. The latter has 8 time slots, that is to say is suitable for 8 communication subscribers. The duration of a time slot (slot width) is 120 μs, and 98 μs thereof are used for user data (consequently 98 bytes can be transmitted as user data per time slot). 22 μs per time slot remain as non-usable bandwidth (header, trailer, CIT, CID).

b) A second sub-time window for communication subscribers with a medium level of communication complexity which is 1040 μs long. Here, 13 time slots are provided for 13 communication subscribers, wherein the length of a time slot is, however, only 80 μs. Since in turn 22 μs non-usable bandwidth is present, 58 μs of said length are used for user data, which can consequently be up to 58 bytes long.

c) A third sub-time window for communication subscribers with a low communication requirement, at present 1000 μs long. This sub-time window has 25 time slots which are consequently assigned to 25 different communication subscribers. The slot width, that is to say the length of a time slot, is 40 μs, wherein in turn 22 μs are present as non-usable bandwidth, and 18 μs are present for user data, and consequently a byte count of 18 bytes is available.

In the exemplary embodiment according to FIG. 1, the communication subscribers with a high level of communication complexity may include, for example, the engine control device 3, the transmission control device 4, the ESP control device 5 and the brake control device 6. The subscribers with a medium communication requirement include the airbag control device 7 and the combination display control device 8. The communication subscribers with a low communication requirement include the steering angle control device 9, the trailer hitch control device 10 and the door control device 11, and their time slots are consequently in the third sub-time window.

One refinement with two different static sub-time windows could contain, for example, the following sub-time windows:

a) A first sub-time window for communication subscribers with a high communication requirement which lasts for 1000 μs, wherein 10 time slots with a duration of 100 μs each are available. 84 μs thereof are used for user data, with the result that 84 bytes are available per time slot. The non-usable bandwidth, that is to say the time period which is used for the header, trailer, CIT and CID, is 16 μs long per time slot.

b) A second sub-time window for communication subscribers with a low communication requirement which is 2000 μs long. The number of time slots, consequently the number of the assigned communication subscribers, is 40 here, and each time slot is 50 μs long. With the non-usable bandwidth of 16 μs per time slot for the user data this results in 34 μs, consequently 34 bytes per time slot.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for operating a bus system for communication with a plurality of communication subscribers, in a land vehicle or aircraft, comprising:
   defining a static time window, the static time window being cyclically recurring and having a fixed length;
   dividing the static time window into at least first and second coherent sub-time windows, the first coherent sub-time window being divided into first equal length time slots each of which has a first byte count, the second coherent sub-time window being divided into second equal length time slots each of which has a second byte count, the first byte count being different from the second byte count; and
   assigning to each communication subscriber a time slot selected from the group consisting of the first equal length time slots and the second equal length time slots, the time slot being assigned such that each communication subscriber has a specified byte count and a specified slot for transmitting user information, which are fixed during operation of the bus system.

2. The method as claimed in claim 1, wherein the static time window is divided into only the first and second coherent sub-time windows.

3. The method as claimed in claim 1, wherein
   dividing the static time window comprises dividing the static time window into only first, second and third coherent sub-time windows, the third coherent sub-time window is divided into third equal length time slots each of which has a third byte count, the third byte count is different from both the first and second byte counts, and each communication subscriber is assigned a time slot selected from the group consisting of the first equal length time slots, the second equal length time slots and the third equal length time slots.

4. The method as claimed in claim 3, wherein the first coherent sub-time window is defined for and the first equal length time slots are assigned to communication subscribers with a large communication requirement, the second coherent sub-time window is defined for and the second equal length time slots are assigned to communication subscribers with a medium communication requirement, and the third coherent sub-time window is defined for and the third equal length time slots are assigned to communication subscribers with a low communication requirement.

5. The method as claimed in claim 3, wherein the first coherent sub-time window is defined for and the first equal length time slots are assigned to communication subscribers with a large communication requirement, the first byte count is larger than 60 bytes, the second coherent sub-time window is defined for and the second equal length time slots are assigned to communication subscribers with a medium communication requirement, the second byte count is between 20 and 70 bytes, the third coherent sub-time window is defined for and the third equal length time slots are assigned to communication subscribers with a low communication requirement, and the third byte count is less than 24 bytes.

6. The method as claimed in claim 1, wherein the first and second byte counts are independently fixed to values of from 0 to 254 bytes.

7. The method as claimed in claim 1, wherein the static time window is part of a communication cycle which comprises the static time window and a dynamic time window, and the dynamic time window has individual time slots with a size which is adapted at least partially dynamically during operation of the bus system.

8. The method as claimed in claim 7, wherein each time slot of the static time window comprises a header, a trailer, a channel idle time, a channel idle delimiter and a payload for transmitting user information.

9. The method as claimed in claim 1, wherein each time slot comprises a transmission time period which cannot be used for transmitting user information, and the transmission time period is used for at least one of a header, a trailer, a channel idle time and a channel idle delimiter.

10. A land or air motor vehicle, comprising:

a plurality of communication subscribers; and a bus system though which the plurality of communication subscribers communicate, the bus system comprising a communication controller to:

define a static time window, the static time window being cyclically recurring and having a fixed length;

divide the static time window into at least first and second coherent sub-time windows, the first coherent sub-time window being divided into first equal length time slots each of which has a first byte count, the second coherent sub-time window being divided into second equal length time slots each of which has a second byte count, the first byte count being different from the second byte count; and assign to each communication subscriber a time slot selected from the group consisting of the first equal length time slots and the second equal length time slots, the time slot being assigned such that each communication subscriber has a specified byte count and a specified slot for transmitting user information, which are fixed during operation of the bus system.

11. The motor vehicle as claimed in claim 10, wherein the communication subscribers are selected from the group consisting of an engine control device, a transmission control device, an electronic stability program (ESP) control device, a brake control device, an airbag control device, a combination display control device, a steering angle control device, a trailer hitch control device and a door control device.

12. The motor vehicle as claimed in claim 10, wherein the bus system is configured according to a FlexRay standard.

* * * * *

UNITED STATES PATENT AND TRADEMARK OFFICE
CERTIFICATE OF CORRECTION

| | | |
|---|---|---|
| PATENT NO. | : 9,135,196 B2 | Page 1 of 1 |
| APPLICATION NO. | : 14/125446 | |
| DATED | : September 15, 2015 | |
| INVENTOR(S) | : Guertner | |

It is certified that error appears in the above-identified patent and that said Letters Patent is hereby corrected as shown below:

In the claims

Claim 10, Column 8, Line 16

Delete "though" and insert --through--, therefor.

Signed and Sealed this
Fifteenth Day of December, 2015

Michelle K. Lee
*Director of the United States Patent and Trademark Office*